United States Patent [19]

Fujita et al.

[11] Patent Number: 5,059,881
[45] Date of Patent: Oct. 22, 1991

[54] NUMERICAL CONTROL APPARATUS HAVING A BACKLASH COMPENSATION FUNCTION AND METHOD THEREOF

[75] Inventors: Jun Fujita; Michio Matumoto, both of Shizuoka, Japan

[73] Assignee: Toshiba Kikai Kabushiki Kaisha, Tokyo, Japan

[21] Appl. No.: 635,227

[22] Filed: Dec. 28, 1990

[30] Foreign Application Priority Data

Dec. 28, 1989 [JP] Japan .................................. 1-343370

[51] Int. Cl.⁵ ............................................. G05B 11/01
[52] U.S. Cl. ..................................... 318/630; 318/569; 318/571; 318/573
[58] Field of Search ............... 318/569, 571, 573, 600, 318/630, 74, 77, 409

[56] References Cited

U.S. PATENT DOCUMENTS

| | | | |
|---|---|---|---|
| 3,886,424 | 5/1975 | Hoshina et al. | 318/630 |
| 4,251,761 | 2/1981 | Inoue | 318/630 |
| 4,502,108 | 2/1985 | Nozawa et al. | 364/170 |
| 4,868,475 | 9/1989 | Rogozinski et al. | 318/632 |
| 4,890,046 | 12/1989 | Kurakake et al. | 318/630 |

*Primary Examiner*—William M. Shoop, Jr.
*Assistant Examiner*—Larry Moskowitz
*Attorney, Agent, or Firm*—Cushman, Darby & Cushman

[57] ABSTRACT

Backlash compensation for a numerical control apparatus. Backlash compensation is intelligently applied based on a judgment as to a change in direction or velocity commanded for a cutting tool, table, or the like. Backlash compensation data is stored into a memory of a numerical control apparatus. A judgement is made as to the necessity of backlash compensation, based on velocity data of the feed mechanism, and deciding whether the feed mechanism is being stopped or reversed. Compensation data is output to a servo drive unit.

15 Claims, 5 Drawing Sheets

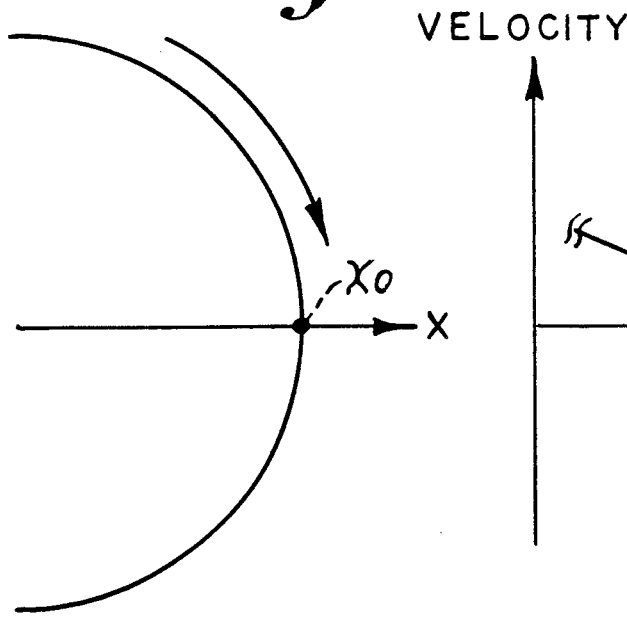
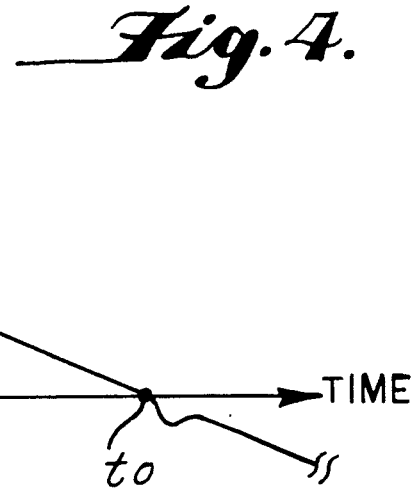
Fig.3.  Fig.4.
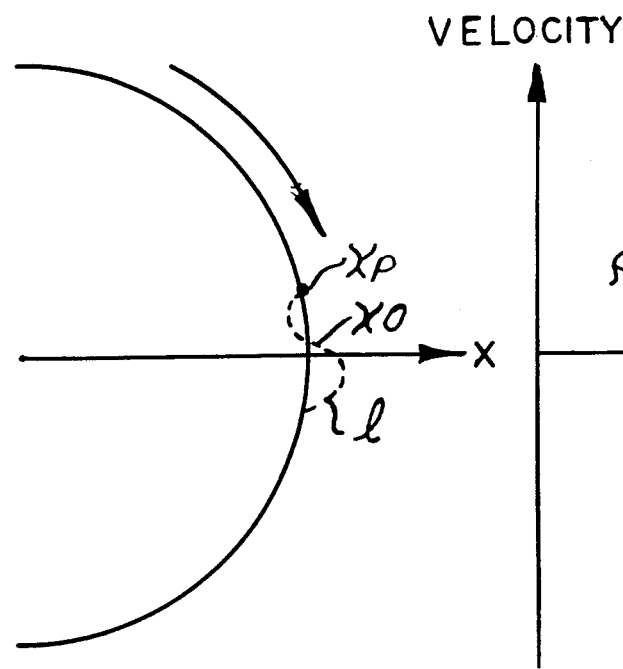
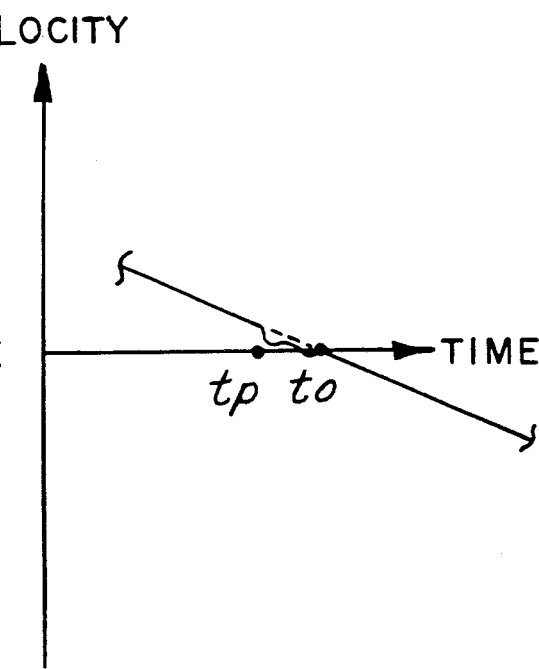
Fig.7.  Fig.8.

NUMERICAL CONTROL APPARATUS HAVING A BACKLASH COMPENSATION FUNCTION AND METHOD THEREOF

BACKGROUND OF THE INVENTION

1. Field of the Invention

This invention relates to a numerical control (NC) apparatus which controls a machine tool, an industrial robot or the like.

More specifically, this invention relates to an arrangement (apparatus and method) for compensating for backlash during feedback control by a numerical control apparatus. This backlash usually occurs in a feed drive mechanism controlled by the numerical control apparatus.

2. Description of the Related Art

A numerical control apparatus for controlling backlash is shown in FIG. 5.

The numerical control (NC) apparatus includes a main control unit 102, position control unit 103, velocity control unit 105 and an amplifier 107.

Main control unit 102 analyzes a mechanism program input from a paper tape 101, and calculates a motion value per one sampling period of control in the numerical control apparatus. Main control unit 102, then, outputs position command $X_c$ to position control unit 103 in the servo mechanism.

Position control unit 103 calculates a velocity command $V_c$ based on a difference between position command $X_c$ and position feedback signal X, and outputs Vc to velocity control unit 105. Position feedback signal X indicates the actual position of a table 21. It is detected using a position detector 17 attached to motor 109. Table 21 is an object controlled by the numerical control apparatus.

Velocity control unit 105 calculates torque command $T_c$ based on a difference between velocity command $V_c$ and velocity feedback signal V, and outputs Tc to amplifier 107. The velocity feedback signal V is a signal provided by a velocity detector 23 that is mechanically connected to motor 109. Torque command $T_c$ is power-amplified by amplifier 107 which provides a current difference $I_c$ corresponding to a difference between the current corresponding to output torque Tc and a feedback current. Current Ic causes motor 109 to generate torque.

The torque generated by current $I_c$ flowing through motor 109 is transferred to ball screw 15 via gear 11 and gear 13. Ball screw 15 converts the torque to a propulsive power for moving table 21.

There is formed a semi-closed loop servo mechanism which includes motor 109 gear 11, gear 13 and ball screw 15. The output torque of motor 109 is transferred to an control object, such as a table 21 or the like, via such a semi-closed loop servo mechanism.

However, the servo mechanism has a backlash which is caused by such gears and a ball screw. The backlash is particularly acute when the direction of motion of table 21 is changed. This backlash causes a machining error.

To compensate backlash, there is provided a command direction memory unit 25, old direction memory unit 31, command direction reverse judgement unit 27 and compensation value output unit 29 are provided for compensating a backlash when a control object is controlled to point in a fixed position.

Command direction memory unit 25 stores data relating to a direction commanded by main control unit 102 to position control unit 103 per one sampling period. The data of the direction of a motion is updated each sampling period.

Old direction memory unit 31 stores direction data which was output already, and changes the data if the direction commanded is changed.

Command direction reverse judgement unit 27 judges whether a command direction is reversed or is not the same as a command direction already commanded.

Compensation value output unit 29 outputs a backlash compensation value to position control unit 103. When a compensation command is input from command direction reverse judgement unit 27, the backlash compensation value is output to move much or less than a command value $X_c$.

The process carried out by command direction reverse judgement unit 27 is shown in FIG. 6.

At step ST1, the command direction input from command direction memory unit 25 is examined and it is determined whether the command direction is negative, zero, or positive of the motion. When positive, process control goes to step ST21. When zero, the process is ended. When negative process control transfers to step ST22.

At step ST21, direction information stored in old direction memory unit 31 is judged that the direction is negative, zero, or positive. (Assume that direction data stored in old direction memory unit 31 is not zero.) If the result is positive, the process is ended. If the result is negative, the command position is reversed, then process control goes to step ST31.

At step ST31, compensation value output unit 29 is commanded to output a backlash compensation value. After the compensation value is output. Process control goes to step ST4.

At step ST4, motion direction stored in old direction memory unit is updated and the old direction stored is changed to the new direction which was commanded.

Step ST22 and step ST32 operate substantially the same as corresponding steps ST21 and ST31, however they apply when the decision at step ST1 is "negative".

Backlash compensation as shown in FIGS. 5 and 6 is carried out somewhat early rather than the time when the compensation is needed because of the existence of time lag in the control system including the drive mechanism. It is insufficient in the control timing for the compensation because of the unmatching of the feed speed and compensation.

FIG. 7 shows an example of cutting which is executed using simultaneous two axis control in a machine tool. $X_c$ is the position where backlash compensation is requested. Backlash compensation is executed at a position $X_p$ where the tool does not reach $X_o$.

FIG. 8 is a graph which shows the relation between a cutting velocity and the time. Backlash compensation is carried out at time $t_p$ before the time when the velocity becomes zero. Accordingly, excess cutting is caused at the point $X_p$ on the circumference of the circle, and a swelling is also caused by the reaction. This is shown with a dotted line at the point of the change of a quadrant. This results in a machining error for a workpiece and causes a cutter mark on the workpiece.

Accordingly, it has been desirable to provide a backlash compensation method which can reduce such a generation of a excess cutting or a swelling at the change point of a quadrant in cutting of a workpiece.

SUMMARY OF THE INVENTION

It is an object of the present invention to provide an arrangement for backlash compensation in a numerical control apparatus which can reduce excess cutting or a swelling at the change point of a quadrant.

According to one aspect of this invention, there is provided a method for backlash compensation of a numerical control apparatus having a servo drive means for driving a feed mechanism using a machining program, comprising the steps of:

storing backlash compensation data into a memory of the numerical control apparatus, judging the necessity of backlash compensation from command data in the machining program, if necessary, detecting velocity data of the feed mechanism, deciding stop or reverse of feed mechanism motion controlled by the servo drive means using the velocity data detected in the detected step, and outputting the compensation data into the servo drive means after decision of the stop or the reverse of the feed mechanism.

According to another aspect of the present invention, there is also provided a numerical control apparatus having a backlash compensation function, comprising:

main control means for inputting a machining program and backlash compensation data, and outputting a motion command, servo drive means for driving a feed mechanism inputting the motion command from the main control means, command direction input means for inputting a command direction in the motion command output from the control means, velocity input means for inputting velocity data output from the servo drive means, judgement means for judging stop or direction reverse of the velocity of the feed mechanism and outputting a compensation command so as to decide a backlash compensation timing, output means for storing the backlash compensation data input by the main control means and outputting the backlash compensation data to the servo drive means receiving the compensation command output from the judgement means, and previous direction storing means for storing command direction previously output from the main control unit.

BRIEF DESCRIPTION OF THE DRAWINGS

FIG. 3 is a chart which shows the backlash compensation point of the present invention;

FIG. 4 is a chart which shows the time when backlash compensation is carried out in a relation between the time and a velocity in a circular cutting using the present invention;

FIG. 7 is a chart which shows the backlash compensation point of the related art; and FIG. 8 is a chart which shows the time when backlash compensation is executed in the relation between the time and a velocity in a circular cutting using the related art.

DETAILED DESCRIPTION OF THE PRESENTLY PREFERRED EXEMPLARY EMBODIMENTS

A presently preferred exemplary embodiment of the present invention will now be described in more detail with reference to the accompanying drawings.

Figure 1:
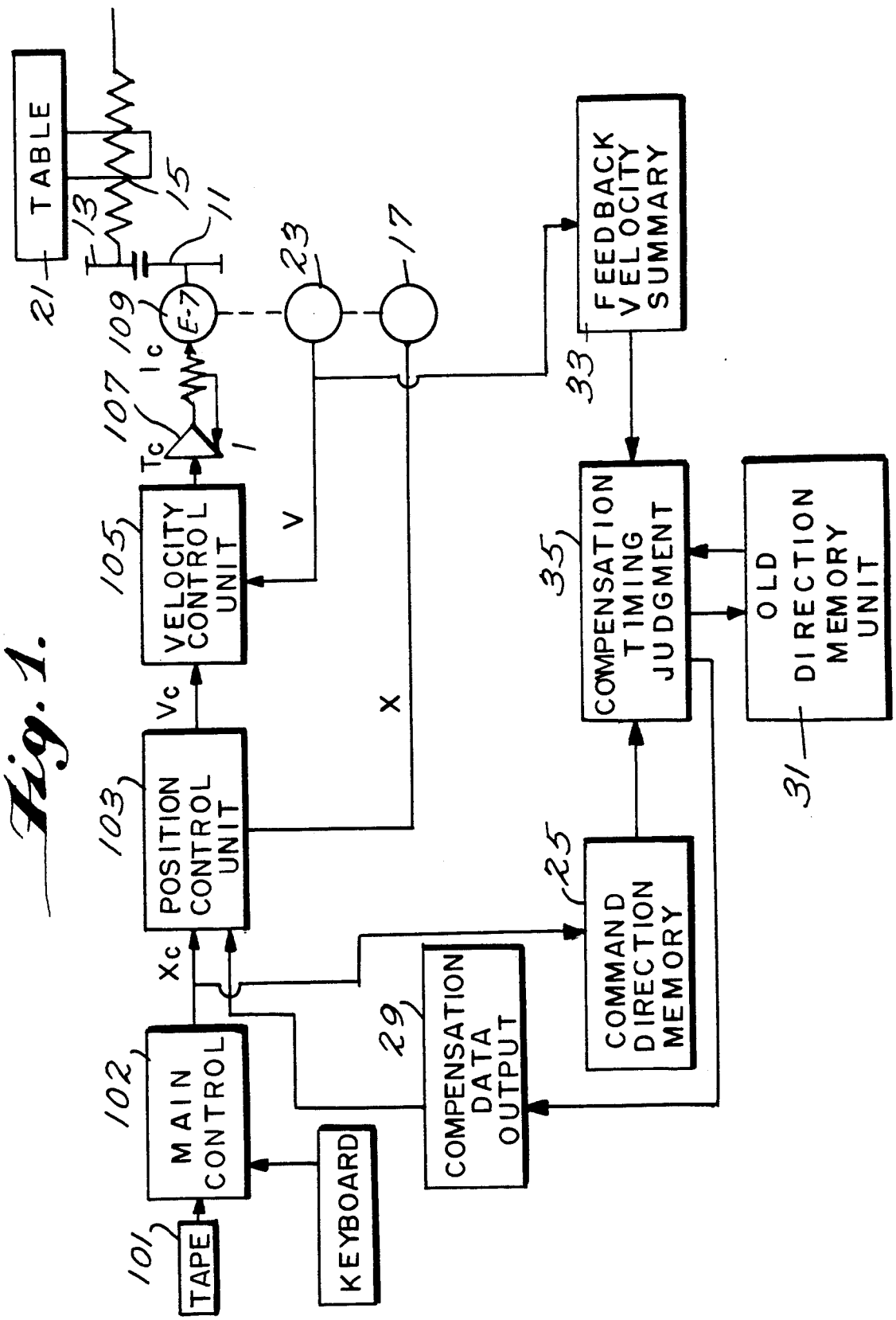
FIG. 1. is a block diagram of an embodiment of the present invention.
Figure 5:
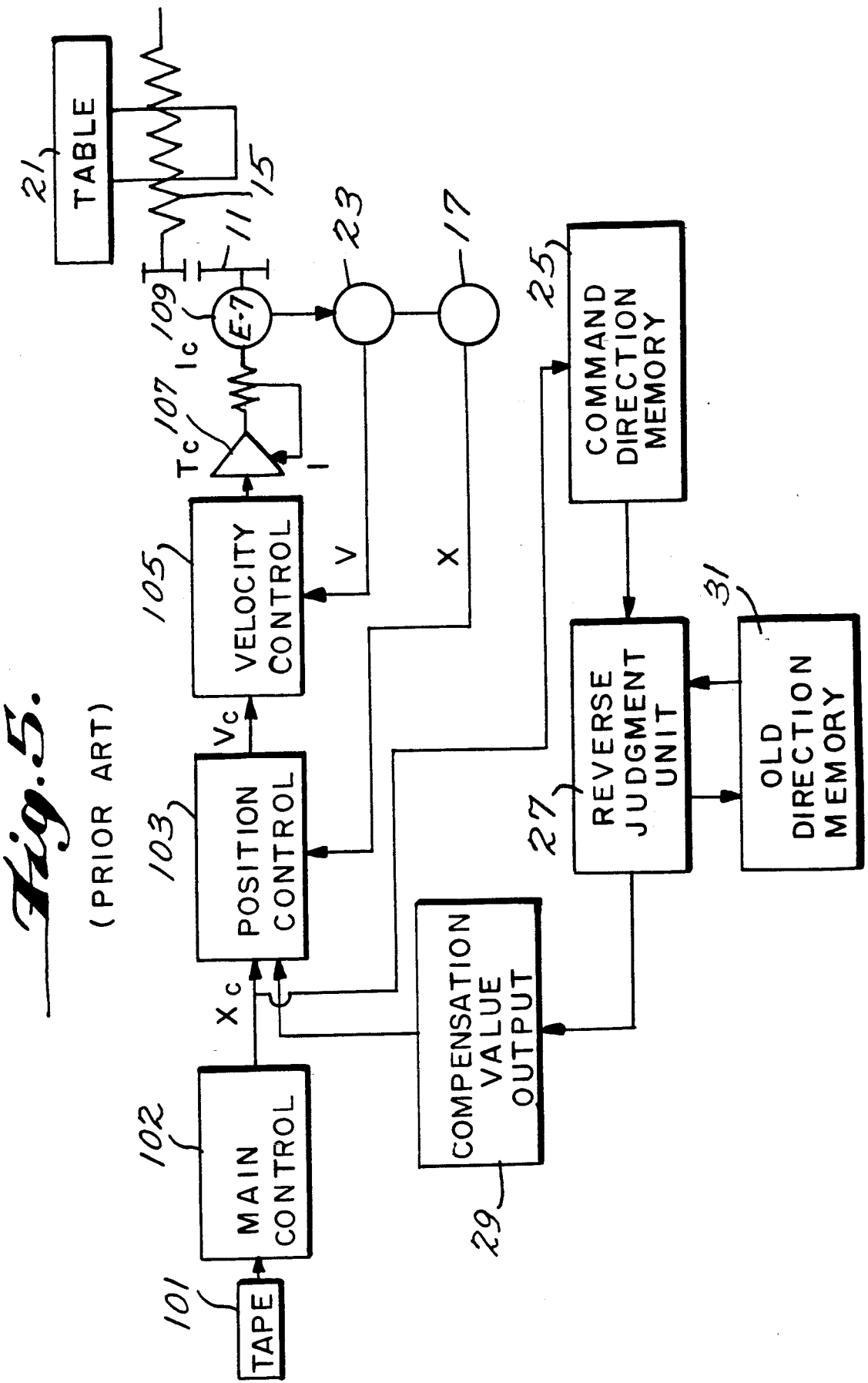
FIG. 5 shows a block diagram of the backlash compensation apparatus of the related art.
Figure 6:
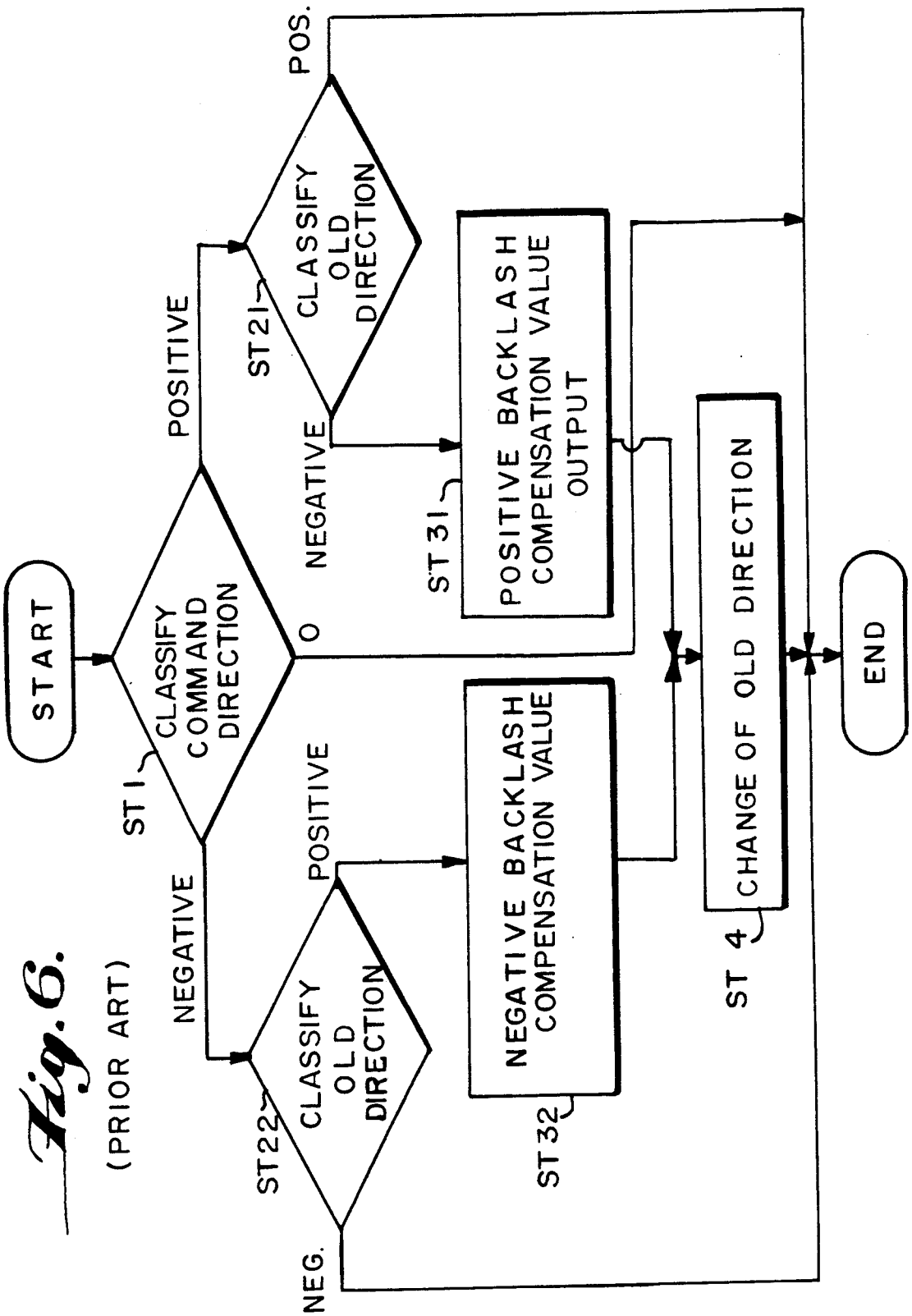
FIG. 6 is a flow chart which show the process carried out by command direction reverse unit 27 in the FIG. 5.

The control block diagram of the embodiment for the present invention is shown in FIG. 1. The reference numerals generally correspond to those used in FIG. 5 to denote the same type of element. Therefore a detailed description of the common elements is omitted.

The presently preferred embodiment of the present invention includes paper tape reader 101, main control unit 102, position control unit 103, keyboard unit 104, velocity control unit 105 and amplifier 107.

Main control unit 102 analyzes a machining program input from a paper tape 101, and calculates a motion value. Main control unit 102, then, outputs position command $X_c$ to position control unit 103.

Position control unit 103 receives the position command $X_c$ and calculates velocity command $V_c$. The velocity command $V_c$ is output to velocity control unit 105. Velocity control unit 105 receives the velocity command $V_c$ and calculates torque command $T_c$. The torque command $T_c$ is output to amplifier 107.

Amplifier 107 receives the torque command $T_c$ and generates an electric current command $I_c$. The electric current command $I_c$ causes motor 109 to rotate. Motor 109 drives gear 11, gear 13 and ball screw 15. The rotation of ball screw 15 causes table 21 to move.

In semi closed loop operation, velocity detector 23 and position detector 17 are attached to the shaft of motor 109. A velocity feedback signal V from velocity detector 23 is coupled to velocity control unit 105. A position feedback signal X from position detector 17 is coupled to position control unit 103. An operator of a machine, such as a machine tool or the like, which is controlled by the numerical control apparatus, uses keyboard unit 104 to input a backlash compensation data.

A command direction memory unit 25 is connected to main control unit 102 so as to receive the command direction output from main control unit 102 to position control unit 103. A feedback velocity summary unit 33 is connected so as to receive from velocity detector 23 the velocity value feedback from velocity detector to store into itself per one control sampling period. Data stored into feedback velocity memory unit is updated per one control sampling period.

Compensation timing judgement unit 35 is connected to both command direction memory unit 25 and feed back velocity memory unit 33 and receives the output data from both of these units. Compensation timing judgement unit 35 is also connected to both old direction memory unit 31 and compensation data output unit 29.

Compensation data output unit 29 receives data from compensation timing judgement unit 35 and outputs data to position control unit 103. The backlash compensation data input from keyboard 104 are stored in main control unit 102 and compensation data output unit 29. Compensation data output unit 29 also outputs the backlash compensation data to position control unit 103 in order to compensate data of position command $X_c$.

Figure 2:
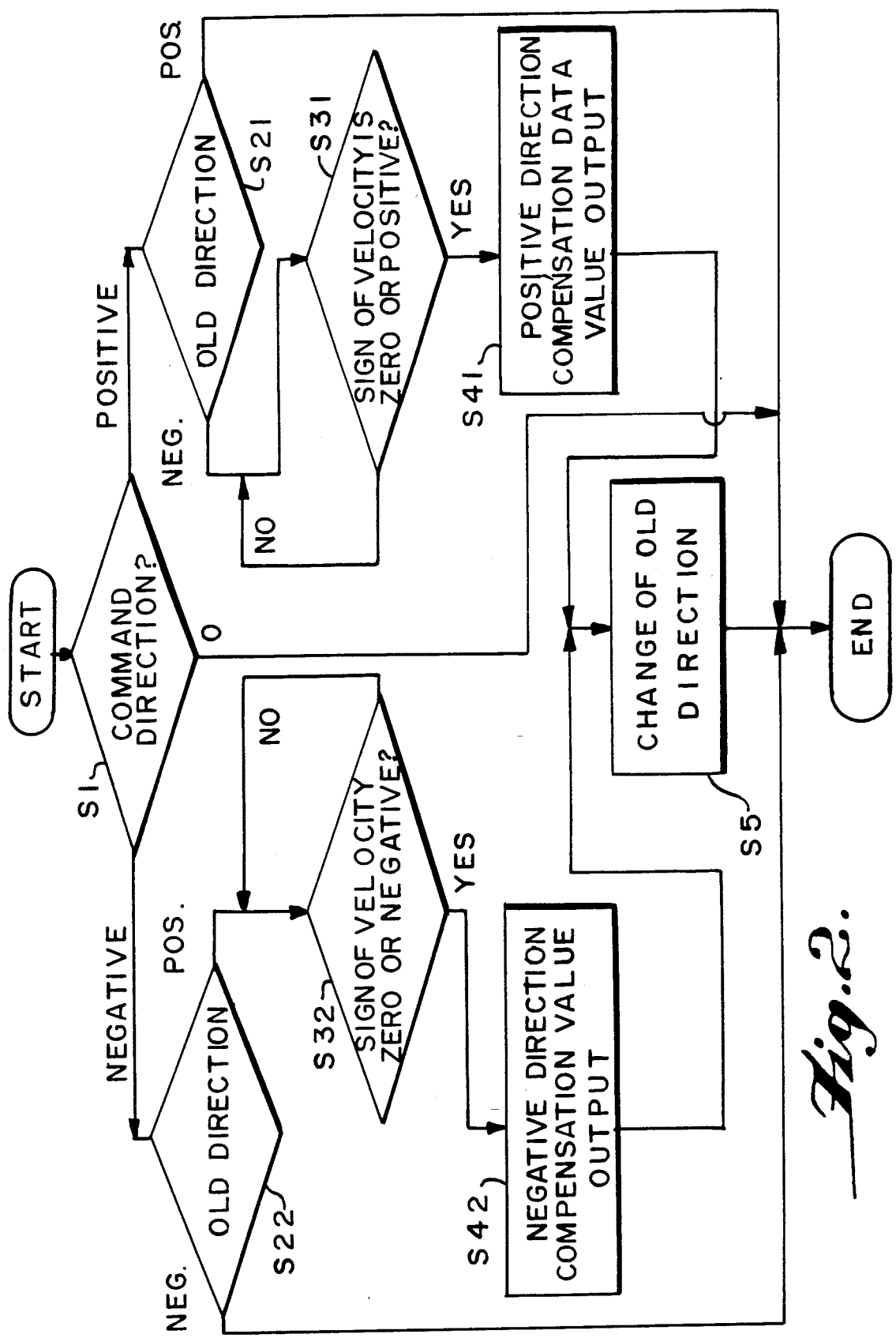
FIG. 2 is a flow chart which shows the process carried out by the timing judgement unit 35 in the FIG. 1.

FIG. 2 is a flow chart which shows the processes carried out by compensation timing judgement unit 35. The operation of the present invention will be described with reference to this flow chart.

STEP S1: The command direction input from command direction memory unit 25. If the command data is positive, process control goes to step S21. If zero, the process goes to END for ending. If the data is negative, process control goes to step 22.

STEP S21: The direction stored in old direction memory unit 31 is judged whether it is positive or negative. (The direction stored in old direction memory unit 31 is not zero.) If it is negative, process control goes to step S31 because of change of moving direction.

STEP S31: The sign of velocity input from feedback velocity memory unit 33 is judged whether it is zero or positive. If it is not zero or positive, there is a wait for a change of the sign of velocity until it becomes zero or positive. When it becomes zero or positive, the process goes to step S41.

STEP S41: A backlash compensation value is output from compensation value output unit 29.

STEP S22: If the command direction is negative, the process goes to step S22. Old direction stored in old direction memory unit 31 is judged whether it is positive or negative. If it is negative, the process is ended. If it is positive, process control goes to step S32 because moving direction is changed from positive to negative.

STEP S32: The sign of the velocity input from feedback velocity memory unit 33 is judged if it is zero or negative. If it is not zero or negative, the process is waited for change. When the velocity feedback becomes zero or negative, the process goes to step S42.

STEP S42: A backlash compensation value of negative direction is output from compensation value output unit 29.

STEP S5: The process goes to step S5 after step S41 or step S42. The movement direction data stored in old direction memory unit 31 is updated and a new movement direction stored in command direction memory 25 is used.

FIG. 3 shows the compensation point of the present invention, in which the present invention is used in a circular cutting operation. As shown in the figure, the compensation is executed at point x·on the tool path.

FIG. 4 shows the compensation timing of the present invention. The relation between the velocity V of the tool or the like, and the time t is shown. Backlash compensation is carried out when the velocity of the tool becomes zero at the time t·.

The presently preferred implementation of this invention utilizes a microprocessor and semiconductor memories. For example, the microprocessor is applied to compensation timing judgement unit 35 and compensation value output unit 29.

The present invention could also use semiconductor read only memory (ROM) for storing the control program of the present invention. Further, semiconductor random access read write memory also could be used as a temporary memory as feedback velocity memory unit 33, command direction memory unit 25, and old direction memory unit 31.

Furthermore, several types of velocity detectors may be used as velocity detector 23 for detecting velocity of motor 109. For example, a tachometer generator or optical pulse generator can be used.

Moreover, several types of position detectors may be used as position detector 17 for detecting position of motor rotation. For example, a resolver or a optical pulse generator can be used.

As described above, according to the backlash compensation of the present invention, the backlash compensation is executed after the velocity detected by the velocity detector becomes zero or after the confirmation of reverse for the sign of the velocity. This reduces the excess cutting in the backlash compensation.

Further, according to the backlash compensation of the present invention, a swelling phenomenon at the change point of a quadrant can be reduced. This increases in mechanical accuracy and brings high cutting accuracy.

In summary, this invention provides a numerical control apparatus having a novel backlash compensation arrangement, which can bring a higher level of machining accuracy to manufactured goods.

What is claimed is:

1. A numerical control apparatus having a backlash compensation function, comprising:

main control means for inputting a machining program and backlash compensation data, and outputting a motion command;

servo drive means for driving a feed mechanism inputting the motion command from the main control means;

command direction input means for inputting a command direction in the motion command output from the control means;

velocity input means for inputting velocity data output from the servo drive means;

judgement means for judging stop or direction reverse of the velocity of the feed mechanism, and outputting a compensation command so as to decide a backlash compensation timing;

output means for storing the backlash compensation data input by the main control means, and outputting the backlash compensation data to the servo drive means receiving the compensation command output from the judgement means; and previous direction storing means for storing command direction previously output from the main control means.

2. The numerical control apparatus of claim 1, wherein said servo drive means includes:

a position control unit for controlling position of the feed mechanism, and outputting a velocity command for controlling the velocity of the feed mechanism;

a velocity control unit for inputting the velocity command from the position control unit, and outputting a torque command data;

an amplifier unit for inputting the torque command and translate the torque command into a command electric current;

a servo motor for driving the feed mechanism, by the command electric current;

a velocity detector attached to the servo motor for detecting velocity of the servo motor; and a position detector also attached to the servo motor for detecting rotation thereof.

3. The numerical control apparatus of claim 2, wherein said velocity detector includes a tachometer generator.

4. The numerical control apparatus of claim 2, wherein said velocity detector includes an optical pulse generator for detecting the rotation speed of the servo motor.

5. The numerical control apparatus of claim 2, wherein said position detector includes a resolver.

6. The numerical control apparatus of claim 2, wherein said position detector includes an optical pulse generator for detecting the rotation of the servo motor.

7. The numerical control apparatus of claim 1, wherein said velocity input means includes a semiconductor memory for storing the velocity signal.

8. The numerical control apparatus of claim 1, wherein said command input means includes a semiconductor memory for storing the command direction.

9. The numerical control apparatus of claim 1, wherein said previous direction storing means is a semiconductor memory.

10. The numerical control apparatus of claim 1 further comprising:
    machining program input means for inputting the machining program; and
    compensation data input means for inputting the backlash compensation data input to the main control means by a operator.

11. The numerical control apparatus of claim 10, wherein said machine program input means includes a paper tape reader.

12. The numerical control apparatus of claim 10, wherein said compensation data input means includes a keyboard input operated by the operator.

13. A method for backlash compensation of a numerical control apparatus having a servo drive means for driving a feed mechanism using a machining program, comprising the steps of:
    storing backlash compensation data into a memory of the numerical control apparatus;
    judging the necessity of backlash compensation from command data in the machining program;
    if necessary, detecting velocity data of the feed mechanism;
    deciding stop or reverse of feed mechanism motion controlled by the servo drive means using the velocity data detected in the detecting step;
    outputting the compensation data into the servo drive means after direction of the stop or the reverse of the feed mechanism.

14. The method of claim 13, wherein said judging step includes the steps of:
    inputting a command direction assigned in the command data;
    storing the command direction into a memory; and
    updating the command direction when the command direction is judged to change.

15. The method of claim 13, wherein said detecting step includes the step of detecting velocity of a servo motor controlled by the servo drive means.

* * * * *